(12) United States Patent  (10) Patent No.: US 7,520,196 B2
Stallard  (45) Date of Patent: Apr. 21, 2009

(54) POWER CRANKS

(75) Inventor: Gregory Keith Stallard, 348 Lowr Rd., Piney Flats, TN (US) 37686

(73) Assignee: Gregory Keith Stallard, Piney Flats, TN (US)

( * ) Notice: Subject to any disclaimer, the term of this patent is extended or adjusted under 35 U.S.C. 154(b) by 326 days.

(21) Appl. No.: 11/280,536

(22) Filed: Apr. 29, 2005

(65) Prior Publication Data
US 2007/0137427 A1   Jun. 21, 2007

(51) Int. Cl.
B62M 3/00   (2006.01)
(52) U.S. Cl. .................................................... 74/594.1
(58) Field of Classification Search ............... 74/412 R, 74/413, 421 R, 594.1, 594.2, 594.3
See application file for complete search history.

(56) References Cited

U.S. PATENT DOCUMENTS 608,341  A  *  8/1898  Murray ..................... 74/421 R
4,706,516  A  * 11/1987  Xi ............................. 74/594.1
4,809,970  A  *  3/1989  Beistegui ..................... 482/64
RE40,127  E  *  3/2008  Oda ........................... 280/261

* cited by examiner

Primary Examiner—Vicky A Johnson

(57) ABSTRACT

A variable length, pedal driven, crank mechanism, suitable for use on human powered vehicles; with gear driven transmission assemblies mounted on each end of an axle which is supported by and rotates on bearings. These arms have an inner and outer housing that bolt together forming rigid sealed assemblies, each containing a train of gears that engage the fixed, non rotating, pinion gears, transferring rotation to the proximal drive gears. The proximal gears have splined shafts that extend outside the primary housings on which secondary outer crank arms are attached. The outer crank arms are internally threaded on the side of their proximal ends for the attachment of pedals. This assembly causes the outer arms to extend and increases the amount of torque available to the operator.

9 Claims, 6 Drawing Sheets

POWER CRANKS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

The conventional set of cranks for a bicycle has a set length or distance from the center of the bottom bracket to the center of the pedal. Ground clearance restricts the length that the arms can be made. This also restricts the amount of leverage that the rider has to work with. Mr. Petar Jakovljevic the inventor of U.S. Pat. No. 6,830,259 B2, issued Dec. 14, 2004, states in his Abstract and Claims that his invention allows rotation of the crank 18 through the use of "a flexible drive member such as a timing belt extending around the first and second sprockets", my design uses a train of gears for this application and offers an advantage that is not obvious to most observers; that is in having an even number of gears, Items 28, between the fixed pinion gears, Items 9 and 10, and the proximal gears, Items 18, allows my outer crank arms, Items 5, to complement the preferred direction of rotation of the crank arm assemblies. In my design downward pressure on the pedals rotates the outer crank arms in the same direction of the spur gear that engages the pinion gear. The use of gears has a distinct advantage over the use of timing belts in that they don't stretch, changing the attitude of the assembly after extended use; accurately machined and treated gears running in a sealed housing and oil bath, will give years of service without significant wear. I agree with Mr. Jakovljevic when he states, in lines 35-38 of his Summary, that the pedals can be "fixedly and non-rotatably", however, I believe that most cyclists would prefer the option of mounting their preferred type of pedal, clip less, platform, road, etc. My design allows this option and is threaded to allow for their mounting. His artwork shows the pedal, Item 14, and crank member, Item 18, as a continuous piece. I also feel that my design, which uses flanged bearings, Items 19, which engage both sides of the housings, Items 2 and 3 (right side FIG. 2), is a more rigid, and would be better accepted in the industry and public. Mr. Jakovljevic appears to be using his outer housing as more of a "shield" (section 60 FIG. 3) than a supporting member as in my design. Mr. Kenneth S. Murray the inventor of U.S. Pat. No. 608,341 A, issued Aug. 2, 1898, is using "a sun-and-planet motion, the sun-and-planet gears being enclosed in a hollow crank", lines 74-75 of his Claims. Murray's art also shares a physical resemblance to my Invention; He is, however, obtaining an increase in rotational output or ratio in relation to the number of rotations of the crank. My Invention is using a sun-and-planet motion, with a fixed non rotating sun or "pinion gear" to facilitate an increase in leverage or torque to be used on the existing ratios. Mr. Murray's sun gear and drive sprocket are bolted together as a unit and rotate on the axel. My drive sprocket "7" or sprockets are bolted to the inner housing "3" FIG. 4 of my art. I also use a sealed housing for the exclusion of contaminates and the containment of oil with the idler gears being mounted on bearings for less friction. Mr. Murray mounts his planet gears without the use of bearings at the cost of efficiency, and He also does not seal his housing. Neither Mr. Jakovljevic or Mr. Murray mention in their "Claims" a Ratio of 1:1, as I claim, Mr. Jakovljevics' art implies this, but it is not Claimed.

BRIEF SUMMARY OF THE INVENTION

POWER CRANKS, however, allow the rider to have added torque while maintaining conventional levels of ground clearances. Figure One is a sectional view of a POWER CRANKS assembly. Item 1 being the section of bicycle frame in which the bottom bracket mounts. Item 8 is the axle, splined and threaded on each end for the left and right crank arm assemblies, Item 2. These arms are internally splined and mate closely to the axle, while being retained by the nuts, Item 12. Items 9 and 10 are pinion gears that thread into the frame; with bearings, Items 14, located inside to facilitate the rotation of the axle and crank arm assemblies around its axis. The crank arms are a housing, comprising of Items 2,3 and 4, which hold a train of spur gears, Items 28, mounted on hollow pins, Items 22, and bearings, Items 23. These hollow pins are sealed by static o rings, Items 26, and the bearings on which the spur gears rotate are retained by snap rings, Items 24. Item 5 is the outer crank arm on which the pedals are threaded. The outer crank arms are also splined internally and are clamped tightly to the external spline of the drive gears, Items 18, by the bolts, Items 21, while being retained by bolts, Items 20. The proximal gears Items 18 rotate on flanged ball bearings, Items 19, that are also sealed. The number of teeth on the proximal gears and pinion gears are equal giving a ratio of 1:1. If the outer arms and crank arm housings are mounted in such a way as to have them fully extended at the twelve o clock position; you have maximum torque at this point. Figure Two is an enlarged view of the right side crank arm. In this view you can see the inner seal, Item 13, which helps hold contaminants out and oil in. Item 7 is the front chain ring. Item 15 is one of three bolts used to hold the ring to the crank arm. Items 16 are bolts used to hold the crank arm housing together. Item 17 is one of nine alignment sleeves in this view that also help make the housing more rigid. Item 6 is the pedal. Item 25 is a spacer-compression ring used to load the inner race of the bearing against the axle shoulder. Figure Three is a side view of the right side crank arm housing showing the gears in mesh. The spline of gears, Items 9 and 18, are shown facing the viewer for clarity. Figure Four is a side and sectional view of the inner crank arm housing showing the bolt and pin hole arrangement more clearly. Figure Five is an enlarged view of the outer crank arm, its spline and clamp bolt. Figures Six, Seven and Eight are side views of the left side crank arm housing its gear train, hole pattern and outer crank arm. The spline of gears, Items 10 and 18, are also shown facing the viewer.

DETAILED DESCRIPTION OF THE INVENTION

Figure 1:
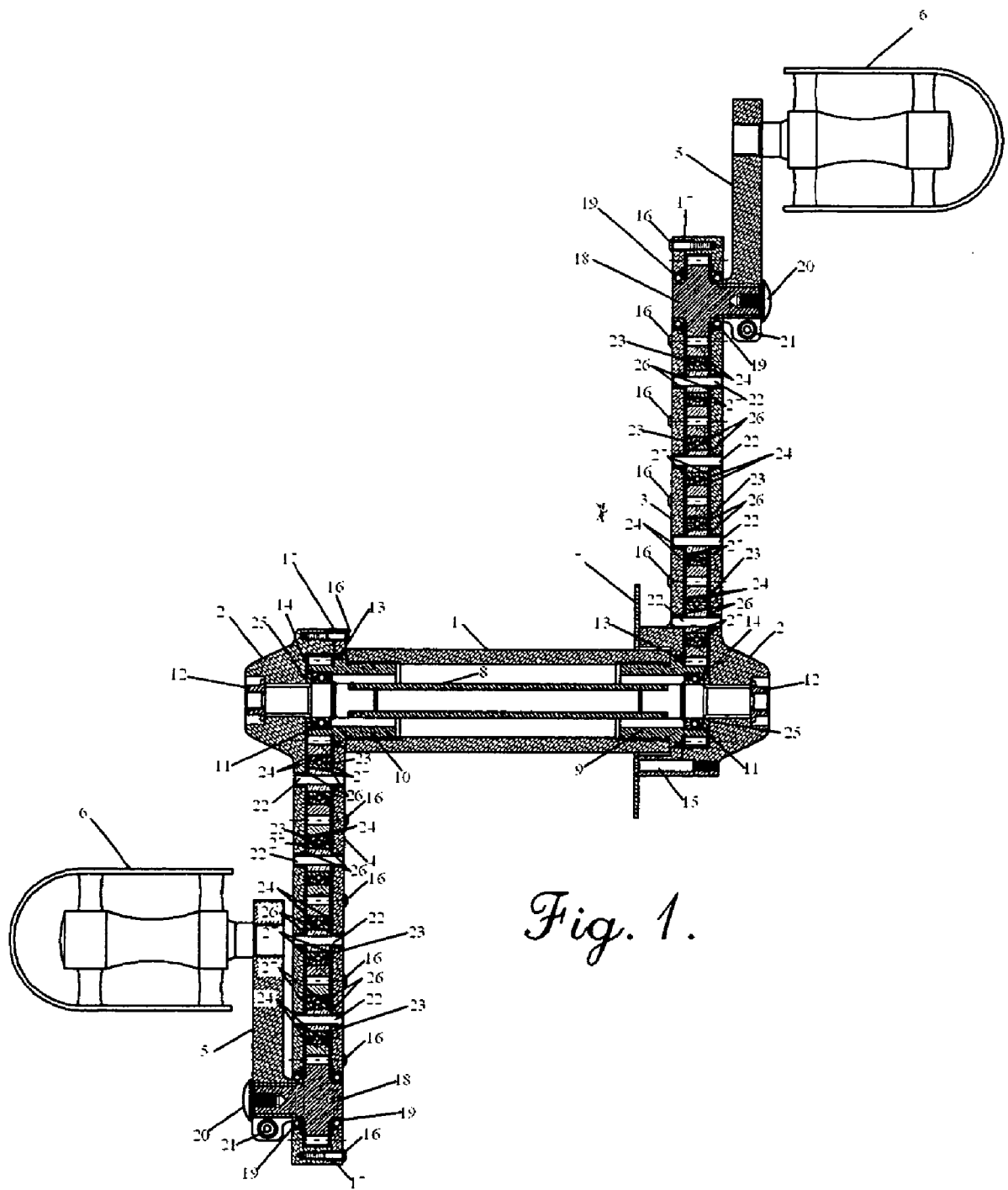
FIG. 1 is a top view of the Power Cranks assembly. This is a sectional view with Item 1 being the frame member in which the assembly mounts.

FIG. 1 is a top view of the Power Cranks assembly, this said assembly being mountable into the frame section 1 of a human powered wheeled vehicle. The preferred vehicle being a conventional bicycle with a frame made specifically for this said assembly. That is allowances for clearance must be made for the extra length of the said assembly in its furthermost extended position and that of the front wheel of a conventionally steered bicycle. The bottom bracket (frame section 1) would be located closer to the rear wheel than that of the conventionally driven bicycle.

Figure 2:
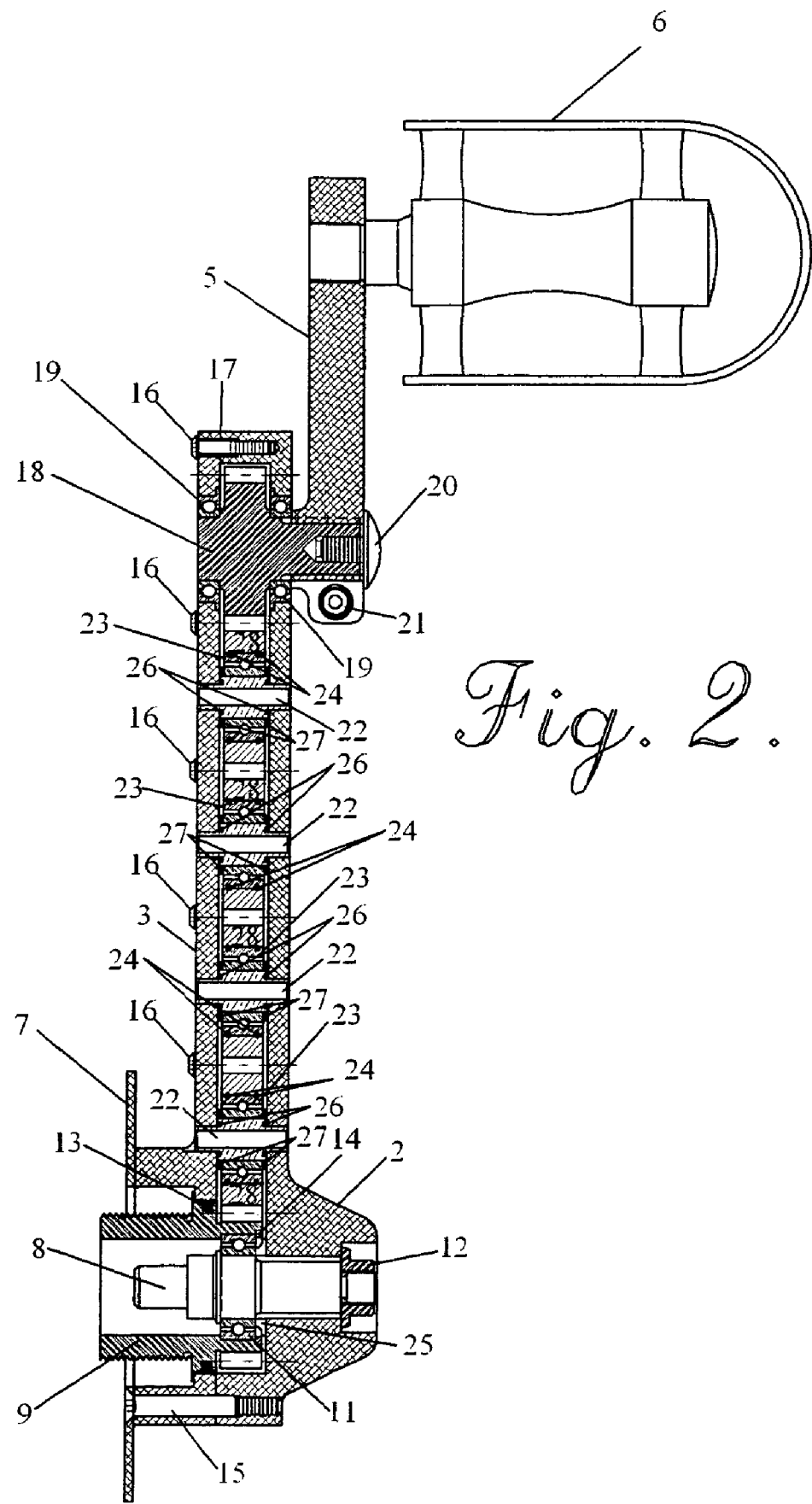
FIG. 2 is larger sectional view of the right side crank assembly.
Figure 3:
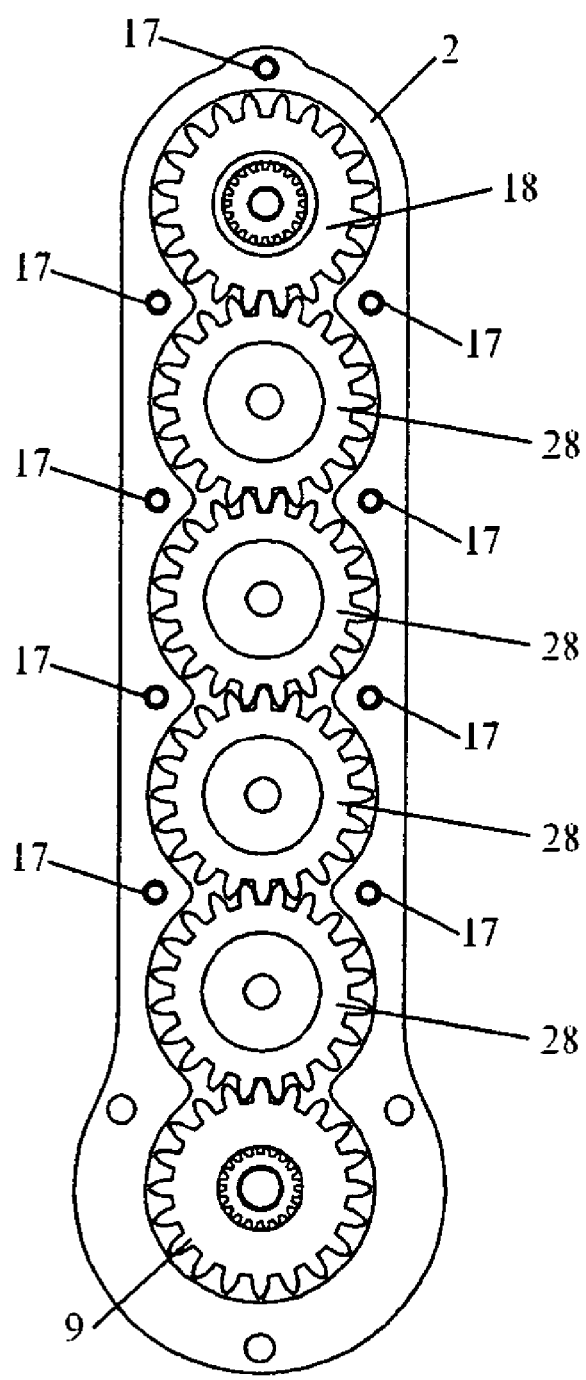
FIG. 3 is a view of the right side primary crank arm Item 2, with the Item 3 housing member removed. The splines as seen through the pinion gear Item 9 are part of the housing Item 2.
Figure 4:
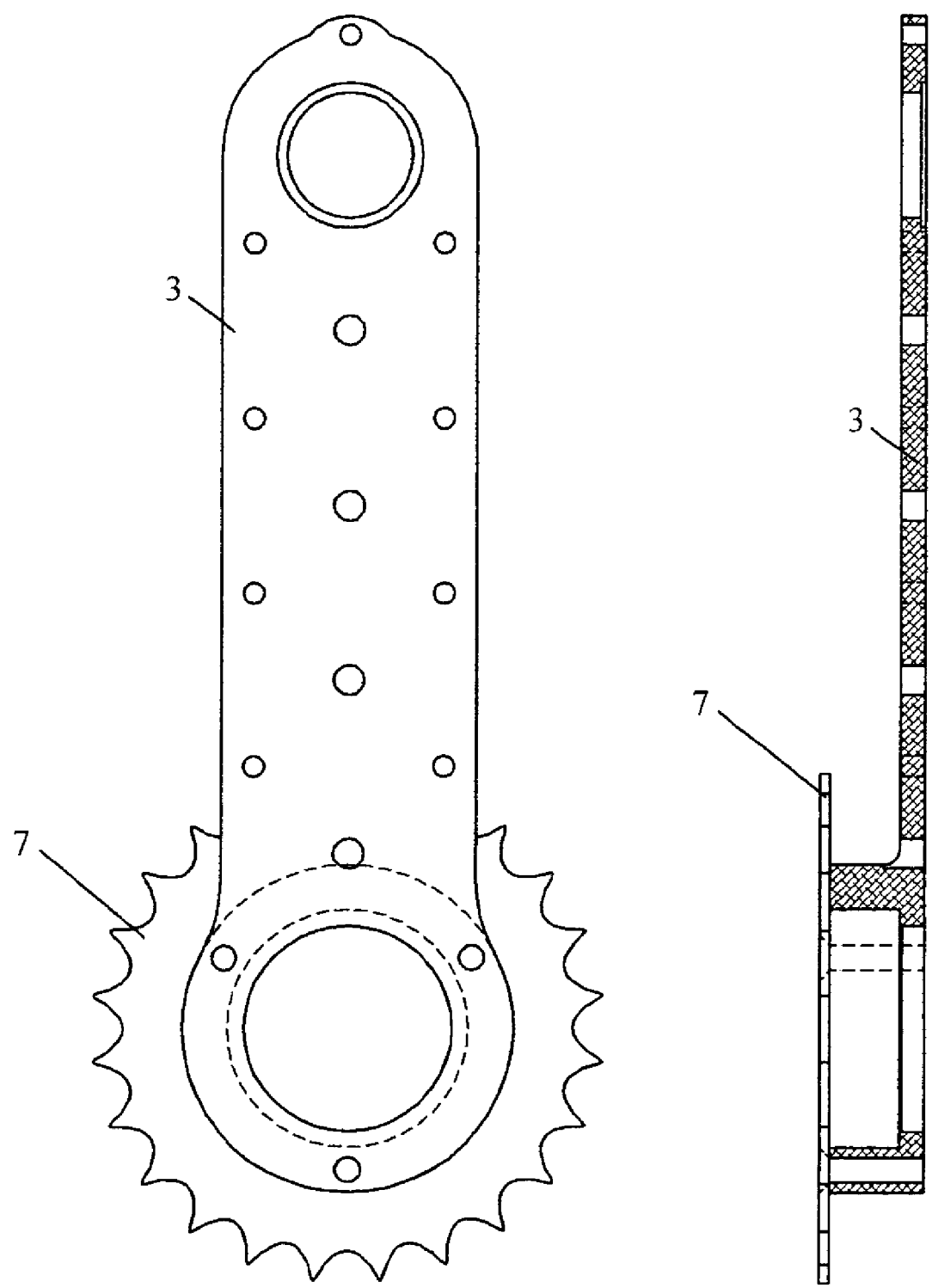
FIG. 4 is an inside view of the inner right side primary crank arm Item 3 with the sprocket Item 7. The sectional view is also Item 3 with sprocket.
Figure 5:
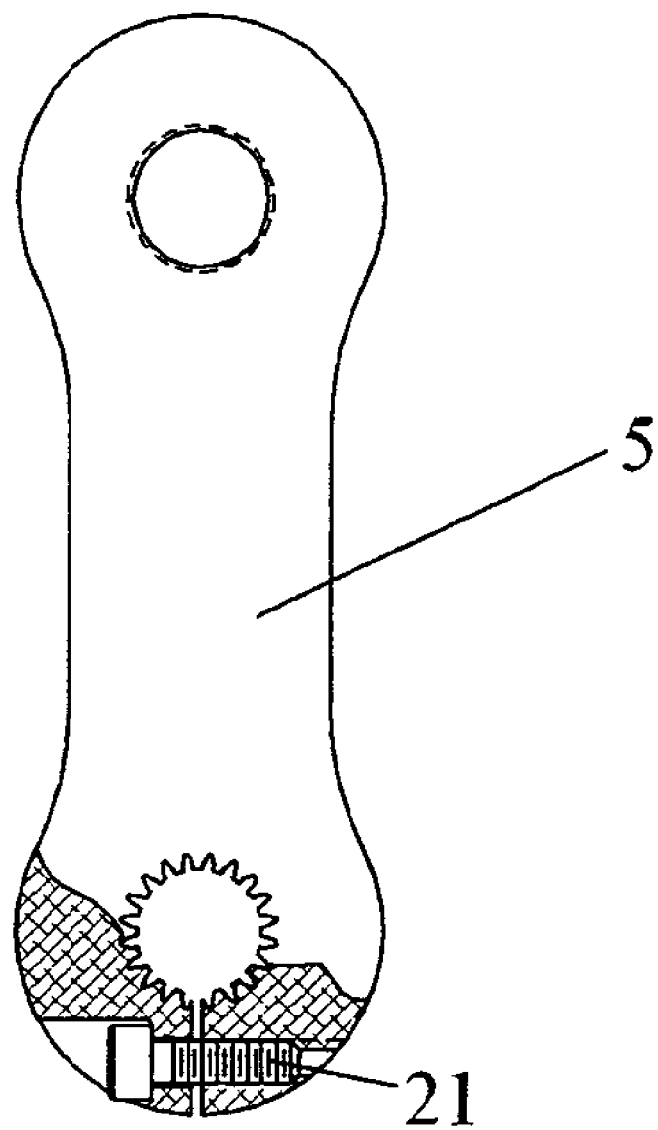
FIG. 5 is a side view of the right side outer crank arm Item 5, with its clamping bolt Item 21. The threaded hole at the top of the view is industry standard right-handed, for the pedals.

FIG. 2 is a sectional view of the Power Cranks assembly, it can be seen that this assembly is a pedal 6 driven sun 9 and planet 18 motion, with the sun gear being fixed nonrotatably into the frame section 1 with threads in the preferred embodiment, however, this sun gear 9 (pinion gear) could be mounted in any number of methods known to the manufacturing industry, including but not limited to splines, bolts, welding, brazing, or adhesives. The said pinion gears 9 and 10 have shoulders that would be firmly seated with measured torque from a torque wrench that is greater than that of the potential human powered application. The use of threads in this preferred embodiment would allow the assembly technician to adjust the attitude of the assembly through the use of shims (no shims are shone in the art; it is drawn as a perfect assembly) between the shoulders of the pinion gears 9,10 and the frame member 1. It would not be the preferred method, but it is also possible that the frame section could also be machined with material being removed by a skilled technician from the said frame members 1 shoulder or shoulders if necessary to allow for incremental adjustments to the attitude of the pinion gears 9 and 10.

Figures 6, 7, 8:
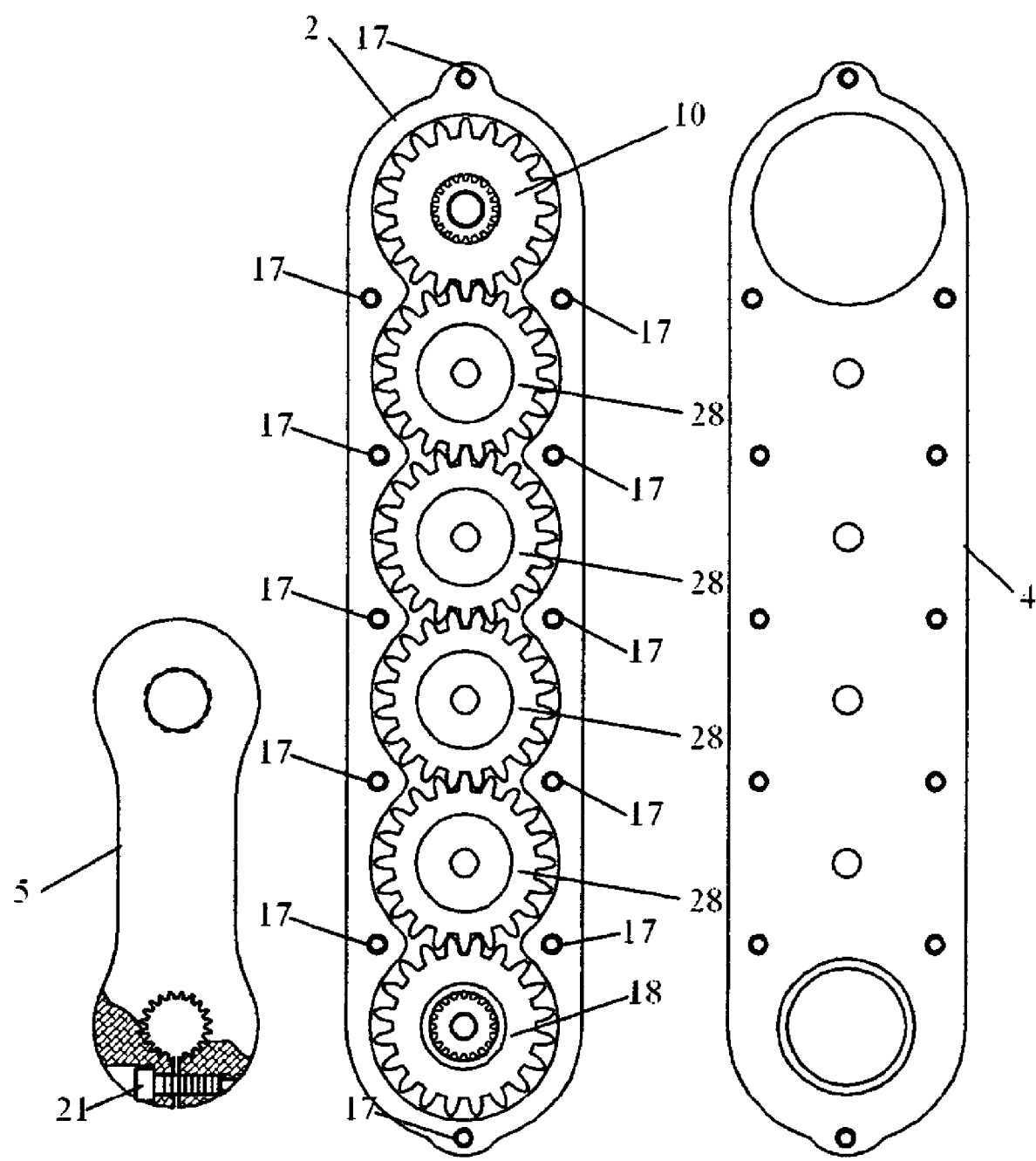
FIG. 6 is a side view of the left side outer crank arm with its bolt Item 21. The threaded hole at the top is industry standard left handed, for pedals.
FIG. 7 is a view of the left side primary crank arm Item 2, with the Item 4 housing member removed. The splines as seen through the pinion gear Item 10 are part of the housing Item 2.
FIG. 8 is an inside view of the left side housing member Item 4.

This variable length and variable torque sun and planet motion crank mechanism is comprised of an axle 8 mounted in sealed bearings 11 with said axle being made hollow through the use of suitably strong tubing, for the reduction of weight, with external splines welded, or bonded to opposing ends, for the purpose of mounting gear driven transmission unites to each of said axle ends; (FIG. 2 should be used in reference to the following text for the sake of simplicity since the left and right side transmission units are similar in construction), the axle 8 being threaded with right-handed threads on the right side and left-handed threads on the left side, for the application of threaded nuts 12 for use in the retention of the primary crank arms 2, and to load the said primary crank arms, spacers 25 and bearings 11 inner races against the axles 8 shoulders; the axle and said axle's supporting bearings 11 are mounted in pinion gears 9 which are threaded for assemble to the frame member, these threads should be left-handed for the right side, and right-handed for the left side so that they remain tight with use, and do not rotate; with said pinion gears each having a precision groove machined around said pinion gear's circumference for the containment of quad type o ring seals 13 or equivalent, with the seals outside diameters making contact with and being compressed to industry standards for the retention of oil and exclusion of outside contaminants by the bores of the inner primary crank housings 3. Each of the transmission units have an outer arm 5 with internal splines (as seen in FIG. 6) precisely made to fit the external splines of the proximal gears of the primary crank arm assemblies. The said outer crank arms have a shoulder on their inner side that circumvent the splines and are pulled tightly against the flanged bearings inner race with bolts 20 to compliment the assembly, and said assemblies' rigidity. The outer crank arms internal splines are split parallel to their axis, with a through bolt 21 perpendicular to this split used to tighten the assembly. The said proximal gears 18 are positioned by and rotate on flanged bearings 19. The bearings that support the said proximal gears are sealed on their outer sides for the exclusion of contaminates and the retention of oil, with the said outer crank arms being threaded to industry standards for the mounting of pedals 6.

Each primary crank arm contains a train of gears 28 in their housing, even in number, between the fixed pinion gears 9 and the proximal gears 18, to complement the preferred direction of rotation of the crank arm assemblies, that is downward pressure on the pedals 6 rotates the outer crank arms 5 in the same direction of the gears 28 that engage the fixed pinion gears 9; with the number of teeth of the said fixed pinion gears being equal in number to the number of teeth on each of the proximal gears, producing a preferred ratio of 1:1. If the outer crank arms are mounted in such a way as to have them fully extended at the twelve o clock position, this gives maximum torque at this point. The right side primary crank assembly has a chain sprocket or sprockets 7, depending on the application, mounted with bolts 15 to the primary housing 2 assembly; with the number of teeth on said sprocket also being dependent upon the application and desired ratio, with the chain being made to engage a suitable driven cluster of sprockets with a derailleur as used with multi speed bicycles; or it could also be made to engage a sprocket on a multi speed planetary transmission common to the bicycle industry. A gear train 28 is enclosed within said primary housings, with the number of idler gears 28 that are engaged between the pinion and proximal gears being even in number, with each gear 28 of the gear train between the pinion 9 and proximal gears 18 being mounted on bearings 23 and hollow pins 22 which are sealed on each end with o rings 26 that fit into grooves precisely machined into the face of each shoulder, with each shoulder also serving to keep the pins centered in their housing; the said pins being hollow to reduce weight, with said bearings inner races precisely mating the major outside diameter of the supporting pin, and being retained in the bore of the gears by snap rings 24 and metal to metal fit; with spacers 27 on each side of the inner race of said bearings, to keep them centered in their housing so that they do not rub the sides creating friction and reducing efficiency. The inner 3 and outer 2 primary crank housings are joined together with bolts 16 and alignment sleeves 17, with these said sleeves also serving as a strengthening member, preventing unwanted movement between the said inner and outer housings with the said inner and outer housings mating surfaces being precisely machined and sealed with a suitable sealant for the retention of oil.

I claim:

1. A variable length crank mechanism for use on a bicycle, comprising: an axle mounted in sealed bearings with said axle being made hollow with external splines mounted to opposing ends, a gear driven transmission unit mounted to each of said axle's ends; said axle being threaded with right-handed threads on the right side and left-handed threads on the left side; said axle having threaded nuts spacers and bearing inner races mounted against a shoulder of the axle; the axle and said bearings are mounted in pinion gears which are threaded for assembly to a frame member, said pinion gear threads being left-handed for the right side, and right-handed for the left side so that they remain tight with use and do not rotate; with said pinion gears each having a groove around the circumference for the containment of an o ring seal, with the seals outside diameters making contact with and being compressed for the retention of oil and exclusion of outside contaminants; each said transmission unit having an outer arm with internal splines and bolts used to fasten said outer arm to external splines of a proximal gear of a primary crank arm assembly; said proximal gear being positioned by and rotating on sealed, flanged bearings; with said outer crank arms being threaded for the mounting of pedals; each said primary crank arm containing a train of gears in a primary housing assembly, said train of gears are even in number and located between said pinion gear and said proximal gear; said pinion gears each having a number of teeth being equal in number to the number of teeth on each of the proximal gears, producing a ratio of 1:1, one of the primary housing assemblies having a chain, and at least one sprocket mounted with bolts to said primary housing assembly; said gear train being enclosed within said primary housings assembly, each gear of the gear train mounted between the pinion gear and the proximal gear; said gears of the gear train being mounted on bearings and pins which are sealed on each end with o rings that fit into grooves on the face of each shoulder, with each shoulder to keep the pin centered in said primary housing assembly; said pins being hollow, said bearings inner races mating the major outside diameter of said pin, said bearings inner races being retained in the bore of the gears of said gear train by snap rings and a metal to metal fit; spacers located on each side of said bearings inner race centered in said primary housing assembly preventing friction and increasing efficiency; said primary housing assembly having an inner and outer crank housings which are bolted together with bolts and alignment sleeves, said alignment sleeves also serving as a strengthening member, preventing unwanted movement between the inner and outer crank housings; the inner and outer crank housings having mating surfaces sealed with a suitable sealant for the retention of oil and for the exclusion of contaminates.

2. A variable length crank mechanism according to claim 1, in which the number of teeth of the pinion and proximal gears in each said primary housing assembly is equal.

3. A variable length crank mechanism according to claim 1, in which the inner crank housing of the primary housing assembly has a precision bore concentric to the rotation of the axle that is used as a seal fit.

4. A variable length crank mechanism according to claim 1, in which the pins that support the gears of the gear train are sealed on each end to the primary housing assembly with o rings.

5. A variable length crank mechanism according to claim 1, in which the bearings that support the proximal gears are sealed on their outer side.

6. A variable length crank mechanism according to claim 1, in which the bearings that support the proximal gears on each end are flanged, each flange fit to counter bores in the inner and outer crank housings of the primary crank arm.

7. A variable length crank mechanism according to claim 1, in which the proximal gears have shoulders for the flanged bearings to be seated against; with one end of each proximal gear having splines and internal threads on the same end for the fixation and containment of the outer crank arm.

8. A variable length crank mechanism according to claim 1, in which the outer crank arms have internal splines that fit the external splines of the proximal gears, with the splines parallel to the axis of the axle, with a through bolt perpendicular to the axis to tighten the assembly.

9. A variable length crank mechanism according to claim 1, in which the outer crank arms have a shoulder on their inner side that circumvent the splines and are pulled tightly against the flanged bearings inner race with bolts.

* * * * *